3,409,686
ISOMERIZATION OF ALKYL AROMATIC HYDROCARBONS USING A CRYSTALLINE ALUMINOSILICATE CATALYST

Roy T. Mitsche, Island Lake, Ill., assignor to Universal Oil Products Company, Des Plaines, Ill., a corporation of Delaware
No Drawing. Continuation-in-part of application Ser. No. 517,845, Dec. 30, 1965. This application Apr. 8, 1966, Ser. No. 541,128
8 Claims. (Cl. 260—668)

ABSTRACT OF THE DISCLOSURE

Isomerizing an alkyl aromatic hydrocarbon by contacting the hydrocarbon, in admixture with $H_2$, with a catalyst comprising at least one active catalyst component, preferably Pt, on an alumina support having dispersed therein less than about 20 weight percent of a finely divided crystalline aluminosilicate, under isomerizing conditions including a temperature of 0°–600° C., a pressure of 1–100 atmospheres, and a hydrogen to hydrocarbon mol ratio of 2:1 to 20:1.

---

This invention relates to a conversion process for the isomerization of an isomerizable alkyl aromatic hydrocarbon into more useful compounds. More specifically, this invention is concerned with a conversion process for the isomerization of an isomerizable alkyl aromatic hydrocarbon utilizing a novel catalyst consisting essentially of a support comprising a finely divided crystalline aluminosilicate suspended in an alumina matrix having at least one catalyst ingredient deposited on said support. This application is a continuation in part of Ser. No. 517,845, filed Dec. 30, 1965.

I have discovered a catalyst which can be effectively employed in isomerization reactions in which, for example, the carbon skeleton arrangement of the alkyl aromatic hydrocarbon may undergo rearrangement.

It is therefore an object of this invention to provide a process for the isomerization of isomerizable alkyl aromatic hydrocarbons utilizing a novel isomerization catalyst.

A specific object of this invention is to provide a novel method and a novel catalyst for isomerizing isomerizable alkyl aromatic hydrocarbons to provide the desired isomerized product in high yields without the inducing of other decomposition reactions.

One embodiment of the invention relates to a conversion process which comprises isomerizing an isomerizable alkyl aromatic hydrocarbon at a temperature in the range of from about 0° to about 600° C., a pressure in the range of from about atmospheric to about 100 atmospheres, and a hydrogen to hydrocarbon mol ratio of from about 2:1 to about 20:1 in contact with a catalyst containing a finely divided crystalline aluminosilicate suspended in an alumina matrix and having at least one active catalytic ingredient carried by the matrix.

Other objects and embodiments referring to alternative isomerizable alkyl aromatic hydrocarbons and to alternative catalytic compositions of matter will be found in the following further detailed description of the invention.

The process of my invention is applicable to the isomerization of isomerizable alkyl aromatic hydrocarbons including, for example, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzene, triethylbenzene, normal propylbenzene, isopropylbenzene, etc. and mixtures thereof. Preferred isomerizable alkyl aromatic compounds are the monocyclic alkyl aromatic hydrocarbons, that is, the alkylbenzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often, alkylate is obtained as a high boiling fraction in which the alkyl group attached to the aromatic nucleus varies in size from about $C_9$ to $C_{18}$. Other suitable alkyl aromatic hydrocarbons, which at specified conditions, depending upon melting point of the alkyl aromatic chosen, would be in liquid form, would include those alkyl aromatic hydrocarbons with two or more aryl groups such as the alkyl substituted diphenyls such as diphenylmethane, the alkyl substituted triphenyls, such as triphenylmethane, the alkyl substituted fluorenes, the alkyl substituted stilbenes, etc. Examples of other alkyl aromatic hydrocarbons utilizable within the scope of this invention which at specified isomerization conditions, depending upon melting point of the alkyl aromatic chosen would be in liquid form, including those containing condensed aromatic rings. These include the alkyl naphthalenes, the alkyl anthracenes, the alkyl phenanthrenes, etc. Of the above-mentioned alkyl aromatic hydrocabons that could be utilized in the process of this invention, the alkyl benzene hydrocarbons are preferred.

As set forth hereinabove, the process of my invention is applicable to the isomerization of alkyl aromatic hydrocarbons. Furthermore, these alkyl aromatic hydrocarbons may be derived as selective fractions from various naturally occurring petroleum streams. For example, they may be separated as individual components or, as certain boiling range fractions by selective fractionation and distillation of catalytically cracked gas oil. Thus, the process of this invention may be successfully applied to and utilized for complete conversion of isomerizable alkyl aromatic hydrocarbons when these isomerizable alkyl aromatic hydrocarbons are present in minor quantities in various fluid streams. Thus, the isomerizable alkyl aromatic hydrocarbons for use in the process of this invention need not be concentrated. For example, isomerizable alkyl aromatic hydrocarbons appear in minor quantities in various refinery streams, usually diluted with gases such as hydrogen, nitrogen, methane, ethane, propane, etc. These refinery streams containing minor quantities of isomerizable alkyl aromatic hydrocarbons are obtained in petroleum refineries from various refinery installations including thermal cracking units, catalytic cracking units, thermal reforming units, coking units, polymerization units, dehydrogenation units, etc. Such refinery off streams have in the past often been burned for fuel value, since an economical process for the utilization of their hydrocarbon content has not been available. This is particularly true for refinery fluid streams known as off-gas streams containing relatively minor quantities of isomerizable alkyl aromatic hydrocarbons.

As hereinbefore set forth, the invention is concerned with a conversion process for the isomerization of isomerizable alkyl aromatic hydrocarbons, said process being effected in the presence of a catalyst which possesses a high degree of hydrocarbon converison activity and is particularly effective as an isomerization catalyst for the isomerizable alkyl aromatic hydrocarbons hereinabove set forth. The novel catalysts employed in this invention consist essentially of a support comprising a finely divided crystalline aluminosilicate dispersed in an alumina matrix and at least one catalytic ingredient deposited on said support. The dual-function catalysts having halogen and a metal possessing hydrogenation-dehydrogenation activity are the preferred catalytic ingredients to be deposited on said support and form a novel catalyst employed in the process of this invention. Especially preferable ingredients are at least one halogen selected from the group consisting of chlorine and fluorine and a metal selected from Group VIII of the Periodic Table (platinum and palladium being the most preferred). One specific catalyst that has been found to be particularly effective contains up to about 0.75 weight percent platinum and up to about 1.0 weight percent chloride, these ingredients being deposited on a support comprising an alumina matrix having less than about 20 weight percent crystalline aluminosilicate dispersed therein.

The crystalline aluminosilicates are composed of $SiO_4$ and $AlO_4$ tetrahedra, a silicon or aluminum atom being centered around four oxygen atoms in the tetrahedra and the oxygens being shared with other surrounding tetrahedra. These aluminosilicates are geometrically arranged to form a pore structure having sufficiently large pore mouths to permit the reactant molecules to pass into said pore structure. Preferable, the aluminosilicates employed in the catalyst support have pore mouths of from about 5 up to about 15 Angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicate to the hydrogen form.

There are numerous types of crystalline aluminosilicates, both synthetic and natural occurring. It is preferable that the pore mouths of the crystalline aluminosilicates have a cross-sectional diameter of from about 5 to about 15 Angstrom units. Among the preferable crystalline aluminosilicates that are suitable are the hydrogen and/or polyvalent forms of faujasite, and mordenite, and especially preferable is the hydrogen form of mordenite. The preparation of these novel catalysts is described in my patent application Ser. No. 517,845, filed Dec. 30, 1965 and the teachings of that application are hereby incorporated into this present application.

The concentration of crystalline aluminosilicate in the alumina matrix is preferably less than about 20 weight percent of the alumina although in some cases greater concentrations may also be suitable. I especially prefer concentrations of aluminosilicate of about 10 weight percent or less. The preferable concentration of Group VIII metal depends to a large extent on the metal. When employing noble metals such as platinum, the concentration on the catalyst is preferably from about 0.05 up to about 5 weight percent whereas in the case of non-noble metals such as nickel, preferable concentration ranges are from about 1 to about 40 weight percent. The halogen content of the catalyst is less critical so that the crystalline aluminosilicate provides a similar type of catalytic activity. Chloride is the preferred halogen and may be present in the catalyst in concentrations up to about 3.0 weight percent although lower values of from about 0.2 up to about 1.0 weight percent are preferred. It is expected that by suitable variation in the type of crystalline aluminosilicate, its form (hydrogen, divalent) and its concentration in the alumina matrix, that it will be possible to eliminate the necessity of any halogen as a catalytic ingredient.

The process of this invention utilizing the catalyst hereinbefore set forth may be effected in any suitable manner and may comprise either a batch or a continuous type of operation. The preferred method by which the process of this invention may be effected is a continuous type operation. One particular method is the fixed bed operation in which the isomerizable alkyl aromatic hydrocarbon is continuously charged to a reaction zone containing a fixed bed of the desired catalyst, said zone being maintained at the proper operating conditions of temperature and pressure, that is, a temperature in the range of from about 0° to about 600° C. or more, a pressure including a pressure of from about atmospheric to about 100 atmospheres or more and a hydrogen to hydrocarbon mol ratio of about 2:1 to about 20:1. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with an adsorbent packing material. The charge passes through the catalyst bed in either an upward or downward flow and the isomerized product is continuously withdrawn, separated from the reactor effluent, and recovered, while any unreacted starting materials may be recycled to form a portion of the feed stock. It is also contemplated within the scope of this invention that reaction gases such as nitrogen, argon, etc., may also be charged to the reaction zone if desired. Another continuous type operation comprises the moving bed type in which the isomerizable alkyl aromatic hydrocarbon and the catalyst bed move either concurrently or countercurrently to each other while passing through said reaction zone.

Still another type of operation which may be used is the batch type operation in which a quantity of the isomerizable alkyl aromatic hydrocarbon and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are given to illustrate the process of the present invention which, however, are not intended to limit the generally broad scope of the present invention in strict accordance therewith.

EXAMPLE I

Aluminum metal, having a purity of 99.99 weight percent is digested in hydrochloric acid to produce a sol having a weight ratio of Al/Cl of about 1.15 and a specific gravity of 1.3450. An aqueous solution containing 28 weight percent HMT is made up and 700 cc. of the HMT solution is added to 700 cc. of the above related sol solution and thoroughly mixed to form a dropping solution. About 10 grams of the hydrogen form of synthetic mordenite in the form of a fine powder is added to the alumina sol and thoroughly dispersed therein. Another portion of the mordenite is chemically analyzed and is found to contain 11.6 weight percent $Al_2O_3$, 87.7 weight percent $SiO_2$ and 0.2 weight percent Na. Still another portion of the mordenite is analyzed for particle size distribution. The results show that 57.6 weight percent of the powder is between 0 and 20 microns in size, 69.5 weight percent of the powder is between 0 and 40 microns in size and 82.1 weight percent of the powder is between 0 and 60 microns in size.

The alumina sol containing the dispersed mordenite is passed through a vibrating dropping head and dropped in discrete particles into a forming oil maintained at 95° C. The rate of vibration and the volumetric flow of alumina sol is set to produce finished spherical particles of about 1/16 of an inch in diameter. The dropped particles are aged in the oil overnight (about 16 hours), separated from the oil and aged in an ammonia solution at 95° C. for about three hours. The aged spherical particles are then water washed to remove neutralization salts and dried. The particles are thereupon calcined at 600° C. for 4 hours in dry air to give a catalyst support having an ABD of between 0.4 and 0.5.

About 350 cc. of the catalyst support is placed in a steam jacketed rotating vessel and 250 cc. of an impregnation solution containing chloroplatinic acid and HCl is added thereto. The impregnation solution contains 131.2 cc. of 10 milligram per milliliter of platinum and 8.4 cc. of concentrated HCl. The vessel is rotated until all the liquid solution is evaporated. The catalyst particles are then oxidized to produce a finished catalyst containing about 0.75 weight percent platinum, about 0.75 weight percent chloride and about 5 weight percent mordenite type aluminosilicate. This catalyst was designated as catalyst A.

EXAMPLE II

A second batch of catalyst is made exactly the same as described in Example I except 20 grams of synthetic mordenite is used instead of 10 grams. This results in a finished catalyst being produced containing about 0.75 weight percent platinum, about 0.75 weight percent chloride and 10 weight percent mordenite. This catalyst is designated as catalyst B.

EXAMPLE III

The catalyst designated as catalyst A prepared according to Example I above is utilized in an isomerization reaction, 50 cc. of the finished catalyst being placed in an appropriate continuous isomerization apparatus. In the experiment, ethylbenzene is charged to the isomerization zone. The reactor is maintained at about 300 p.s.i.g., 460° C. and a hydrogen to hydrocarbon mol ratio of 8:1. Substantial conversion of the ethylbenzene to dimethylbenzene is obtained as is evidenced by gas-liquid chromatography.

EXAMPLE IV

A second portion of the catalyst prepared according to Example I and designated as catalyst A is again utilized in an appropriate continuous isomerization apparatus. In the experiment, 50 cc. of the finished catalyst are placed in the isomerization reaction zone and isopropylbenzene is charged to said reaction zone. The reactor is maintained at about 300 p.s.i.g., about 480° C. and a hydrogen to hydrocarbon mol ratio of 8:1. Substantial conversion of the isopropylbenzene to trimethylbenzene is obtained as is evidenced by gas-liquid chromatography.

EXAMPLE V

The catalyst prepared according to Example II and designated as catalyst B was utilized in an appropriate continuous isomerization apparatus. In the experiment, 25 cc. of catalyst were placed in the isomerization reaction zone and ortho-xylene was charged to said reaction zone so that an LHSV of 4.0 was maintained. The reactor was maintained at about 300 p.s.i.g., a temperature of about 470° C. and a hydrogen to hydrocarbon mol ratio of 8:1. Gas-liquid chromatographic analyses of the product stream indicated that about 87% (of equilibrium) conversion to para-xylene occurred.

EXAMPLE VI

Another 25 cc. of catalyst prepared according to Example I and designated as catalyst A was utilized in an appropriate isomerization apparatus. In the experiment, the catalyst was placed in the isomerization reaction zone and ortho-xylene was charged to said reaction zone so that an LHSV of 4.0 was maintained. The reactor was maintained at about 300 p.s.i.g., about 460° C. and a hydrogen to hydrocarbon mol ratio of 8:1. About 87% (of equilibrium) conversion of the ortho-xylene to para-xylene was obtained as is evidenced by gas-liquid chromatography.

EXAMPLE VII

Another 25 cc. of catalyst prepared according to Example II and designated as B is utilized in an appropriate isomerization apparatus. In the experiment, the catalyst was placed in the isomerization reaction zone and a mixture of ortho-xylene, meta-xylene and a minor amount of para-xylene is charged to said reaction zone so that an LHSV of 4.0 is maintained. The reactor is maintained at about 300 p.s.i.g., about 470° C. and a hydrogen to hydrocarbon mol ratio of 8:1. Substantial conversion of this mixture of xylenes to para-xylene is obtained as is evidenced by gas-liquid chromatography.

I claim as my invention:

1. Process for isomerizing a xylene feed which comprises reacting the feed, in admixture with hydrogen, at isomerization conditions including a temperature of from about 0° C. to about 600° C., a pressure of from about atmospheric to about 100 atmospheres, and a hydrogen to hydrocarbon mole ratio of from about 2:1 to about 20:1, in contact with a catalyst comprising a platinum group metal component on a solid support consisting essentially of an alumina matrix having dispersed therein less than about 20 weight percent of a finely divided crystalline aluminosilicate selected from the group consisting of faujasite and mordenite, said support having been prepared by commingling the crystalline aluminosilicate in finely divided state with an alumina sol, gelling the resultant mixture and then calcining the gelled mixture, said platinum group metal component having been incorporated into said solid support containing crystalline aluminosilicate and alumina after said calcining of the gelled mixture.

2. The process of claim 1 further characterized in that the crystalline aluminosilicate is in the hydrogen form.

3. The process of claim 2 further characterized in that the crystalline aluminosilicate is mordenite and the metal is selected from the group consisting of platinum and palladium.

4. The process of claim 3 further characterized in that the metal is platinum and the concentration of platinum on the catalyst is from about 0.05 to about 5.0 percent by weight.

5. The process of claim 4 further characterized in that said xylene feed is a mixture of xylenes.

6. The process of claim 4 further characterized in that the catalyst contains from about 0.2% to about 3.0% by weight of at least one halogen selected from the group consisting of chlorine and fluorine.

7. The process of claim 1 further characterized in that said xylene feed is ortho-xylene.

8. The process of claim 1 further characterized in that the crystalline aluminosilicate is mordenite, said platinum group metal is palladium, the concentration of palladium on the catalyst being from about 0.05% to about 5% by weight, and said catalyst further comprises from about 0.2% to about 3.0% by weight of chlorine or fluorine.

References Cited

UNITED STATES PATENTS

| | | | |
|---|---|---|---|
| 2,837,582 | 6/1958 | Hill et al. | 260—668 |
| 2,971,904 | 2/1961 | Gladrow et al. | 208—135 |
| 3,078,318 | 2/1963 | Berger | 260—668 |
| 3,120,569 | 2/1964 | Egan | 260—668 |
| 3,140,253 | 7/1964 | Plank et al. | 208—120 |

DELBERT E. GANTZ, *Primary Examiner.*

G. E. SCHMITKONS, *Assistant Examiner.*